United States Patent
Zimmerman et al.

(10) Patent No.: US 8,538,394 B2
(45) Date of Patent: Sep. 17, 2013

(54) SYSTEM AND METHOD FOR ACTIVATING SERVICES ON A WIRELESS DEVICE

(75) Inventors: James P. Zimmerman, Miramar, FL (US); Ricardo Ramon, Hialeah, FL (US); Richard B. Salzman, Miami, FL (US); Paul B. Kozma, Davie, FL (US); Jesus Rodriguez, Pembroke Pines, FL (US)

(73) Assignee: Tracfone Wireless, Inc., Miami, FL (US)

( * ) Notice: Subject to any disclaimer, the term of this patent is extended or adjusted under 35 U.S.C. 154(b) by 55 days.

(21) Appl. No.: 13/355,509

(22) Filed: Jan. 21, 2012

(65) Prior Publication Data
US 2012/0122437 A1    May 17, 2012

Related U.S. Application Data

(63) Continuation of application No. 12/199,770, filed on Aug. 27, 2008, now Pat. No. 8,107,953.

(60) Provisional application No. 61/036,434, filed on Mar. 13, 2008, provisional application No. 60/966,995, filed on Aug. 31, 2007.

(51) Int. Cl.
*H04W 88/02* (2009.01)

(52) U.S. Cl.
USPC ........................................... 455/414.3

(58) Field of Classification Search
USPC ........... 455/433, 552.1, 558, 414.3; 370/328; 375/267
See application file for complete search history.

(56) References Cited

U.S. PATENT DOCUMENTS

| | | | |
|---|---|---|---|
| 6,591,098 B1 | 7/2003 | Shieh | |
| 6,628,934 B2 | 9/2003 | Rosenberg | |
| 7,715,824 B2 | 5/2010 | Zhou | |
| 2004/0023636 A1 | 2/2004 | Gurel | |
| 2005/0240418 A1 | 10/2005 | Chappuis | |
| 2006/0030315 A1 | 2/2006 | Smith | |
| 2007/0099599 A1 | 5/2007 | Smith | |
| 2008/0207181 A1 | 8/2008 | Jiang | |
| 2009/0061839 A1* | 3/2009 | Zimmerman et al. | 455/419 |
| 2011/0032869 A1* | 2/2011 | Natan et al. | 370/328 |
| 2011/0306318 A1* | 12/2011 | Rodgers et al. | 455/410 |

* cited by examiner

*Primary Examiner* — Diane Mizrahi
(74) *Attorney, Agent, or Firm* — Baker & Hostetler LLP (57) ABSTRACT

A system and method for activating services on a wireless device are provided that improve a user's experience and ease of activation/provisioning of services for the wireless device by providing a new provisioning channel for service activations. A user is simply required to input a short activation code(s) into the wireless device which is combined into an activation message along with other device-related information that is automatically retrieved from the wireless device. The generated activation message is then transmitted over the messaging provisioning channel accessible by inactive and/or unprovisioned wireless devices for delivery to a remote site for use in activating services on the wireless device. The services to be activated may include at least one of the following: out of the box activation, device upgrades, device reactivations, wireless number changes, wireless number porting, and the addition or purchasing of services including airtime, enrollments or content.

38 Claims, 6 Drawing Sheets

SYSTEM AND METHOD FOR ACTIVATING SERVICES ON A WIRELESS DEVICE

RELATED APPLICATIONS

This application is a continuation of and claims the benefit of and priority to U.S. application Ser. No. 12/199,770, filed Aug. 27, 2008, issued as U.S. Pat. No. 8,107,953 on Jan. 31, 2012, which claims the benefit of and priority to U.S. Provisional Application Ser. No. 61/036,434, filed Mar. 13, 2008, and to U.S. Provisional Application Ser. No. 60/966,995, filed on Aug. 31, 2007, the contents of each of which are hereby incorporated by reference herein in their entireties.

COPYRIGHT NOTICE

A portion of the disclosure of this patent document contains materials that are subject to copyright protection. The copyright owner has no objection to the facsimile reproduction by anyone of the patent document or the patent disclosure, as it appears in the Patent and Trademark Office file or records, but otherwise reserves all copyright rights whatsoever.

BACKGROUND

The present invention relates to systems and methods for activating wireless services on wireless devices. More particularly, the present invention is a method and system for initial out of the box activation of wireless services on an unprovisioned wireless device.

SUMMARY

A system and method for activating services on a wireless device are provided. In one or more embodiments, the system and method include receiving a code provided by a user of the wireless device to be used for activating services on the wireless device. Device-related information is also automatically retrieved from the wireless device for use in activating services on the wireless device. In one or more embodiments, the retrieved device-related information may include a serial number for the wireless device and a serial number for a subscriber identity module (SIM) card installed in the wireless device, where such serial numbers are automatically retrieved memory components associated with the wireless device and/or SIM card. An activation message including the user-provided code and the retrieved device-related information is generated. The activation message is then transmitted over a provisioning channel available to inactive or unprovisioned wireless devices for delivery to a remote site for use in activating services on the wireless device. In one or more embodiments, the provisioning channel may be a data messaging channel, such as an Unstructured Supplementary Service Data (USSD) channel, a Short Message Service (SMS) messaging channel or a Wireless Application Protocol (WAP) messaging channel. In one or more embodiments, the services requested to be activated include the initial "out of the box" activation of wireless services of an unprovisioned wireless device, such as those wireless devices requiring activation their purchase. In one or more embodiments, the services requested to be activated may include at least one of initial provisioning or activation, device upgrades, device reactivations, wireless number changes, the addition or purchasing of services including airtime, enrollments or content, and wireless number porting for wireless devices that have already been activated.

In one or more embodiments, the wireless device includes an input device, a subscriber identity module (SIM) card, a memory, a processor and a transceiver. The input device allows a user to input an activation code (or codes) used for activating services on the wireless device. The subscriber identity module (SIM) card may include a SIM card memory for storing at least a SIM card serial number. The wireless device memory may be used to store at least the device serial number. The processor may be coupled to the input device, the SIM card and the memory, and configured to collect the activation code(s), the SIM card serial number and the device serial number, and generate an activation message that includes at least the activation code, the SIM card serial number and the device serial number. The transceiver may be coupled to the processor and configured to transmit the activation message over a provisioning channel that is available to inactive wireless devices for delivery to a remote site for use in the activation of services on the wireless device.

According to one or more embodiments, a method for activating an unprovisioned wireless device using a provisioning channel provided by a wireless carrier system is provided. The method includes receiving an activation message transmitted from the unprovisioned wireless device over a provisioning channel accessible to unprovisioned or inactive wireless devices. The activation message includes a user-provided activation code(s) and device-related information automatically collected from the wireless device to be activated. The method further includes forwarding the activation message to a service provider provisioning system for use by the service provider to initiate service activation. In one or more embodiments, an interactive, real-time connection is established over the provisioning channel between the wireless device and the service provider during which the activation message is forwarded to the service provider.

In one or more embodiments, a wireless telecommunication system for activating a wireless device is provided. The wireless telecommunication system may include a transceiver configured to receive an activation message transmitted from the wireless device over a provisioning channel accessible to unprovisioned or inactive wireless devices. The activation message includes a user-provided activation code(s) and device-related information automatically collected from the wireless device to be activated. The wireless telecommunication system may also include a subscriber provisioning system operated by a service provider configured to process the activation message for activating services on the wireless device.

DRAWINGS

The above-mentioned features and objects of the present disclosure will become more apparent with reference to the following description taken in conjunction with the accompanying drawings wherein like reference numerals denote like elements and in which.

DETAILED DESCRIPTION

In the description that follows, the present invention will be described in reference to preferred embodiments for out of the box activation methods and systems. The present invention, however, is not limited to any particular application nor is it limited by the examples described herein. Therefore, the description of the embodiments that follow are for purposes of illustration and not limitation.

Figure 1:
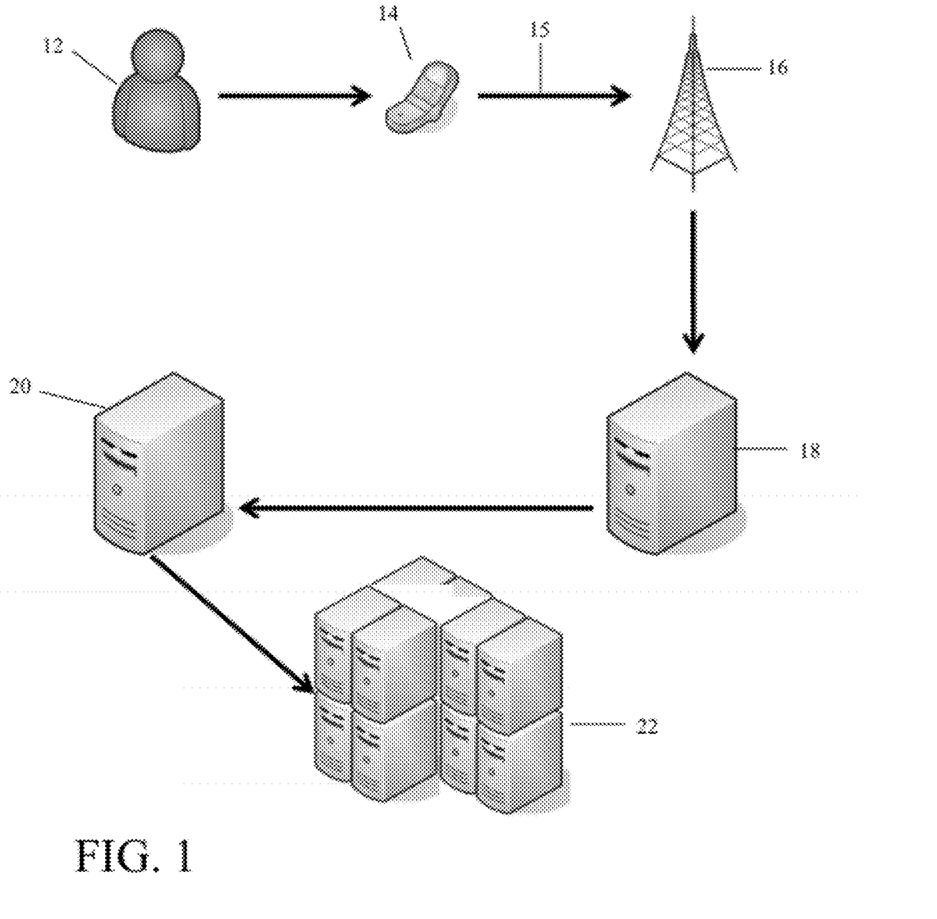
FIG. 1 illustrates a schematic diagram of a wireless device provisioning system in accordance with one or more embodiments of the present disclosure.

FIG. 1 illustrates a wireless device provisioning system 10, according to one or more embodiments of the present disclosure. The wireless device provisioning system 10 may be used to activate services on a wireless device 14. Unlike conventional activation processes for wireless devices that required a user to contact a live customer service representative, utilize an interactive voice response system from a landline or another wireless device, or access an Internet website to use a website activation system in order to activate services on a wireless device, wireless services can be activated within the wireless device provisioning system 10 to activate services for the wireless device 14 without requiring access to an agent, website, or wireless or landline telephone system. In one or more embodiments, the activated services may include the initial activation of the wireless device 14 by user, such as those wireless devices requiring activation their purchase. This initial activation of the wireless device 14 may be described herein as "out of the box" activation. In one or more embodiments, the services requested to be activated may also include at least one of device upgrades, device reactivations, wireless number changes, and wireless number porting for wireless devices that have previously been activated. In one or more embodiments, the wireless device 14 to have services activated may comprise a mobile phone, a smartphone, a wireless computing device or laptop, a wireless handheld device, a mobile computing device, or other type of wireless device having services that can be activated wirelessly.

In one or more embodiments, the wireless device 14 prompts a user 12 to enter an activation code (or codes) into an inactive wireless device 14. In one or more embodiments, the activation code comprises a code that is easy to input and possibly easy for a user to remember, such as, for example but without limitation, a 5 digit zip code, a telephone number, a personal identification number (PIN), or another code. The wireless device 14 may automatically retrieve device-related information, such as but not limited to, a serial number for the wireless device 14 and a serial number for a subscriber identity module (SIM) card installed in the wireless device 14. The activation code is preferably short in length in comparison to serial numbers for the wireless device 14 and the SIM card so that the activation code(s) can easily be entered into the wireless device 14 with only a small number of characters or digits to enter, thereby providing a quick and efficient manner of obtaining relevant information from the user and the wireless device 14 while further minimizing the opportunity for a user to enter incorrect information.

The wireless device 14 then generates an activation message that at least includes the activation code(s) input by the user and the automatically retrieved device-related information, where the activation message is transmitted over a provisioning channel 15 provided over a wireless carrier network 16 that is available to inactive or unprovisioned wireless devices 14. In one or more embodiments, the provisioning channel 15 may be a data messaging channel, such as an Unstructured Supplementary Service Data (USSD) channel, a Short Message Service (SMS) messaging channel or a Wireless Application Protocol (WAP) messaging channel. The activation message is delivered across the wireless carrier network 16 to a remote site for use in activating services on the wireless device 14. The wireless carrier network 16 receives the activation message via a the provisioning channel 15 and then forwards in real time the activation message to a subscriber provisioning system 22 operated by a service provider for the activation of services for the wireless device 14. In one or more embodiments, the services requested to be activated include at least one an initial "out of the box" activation of wireless services of an unprovisioned wireless device 14 or device upgrades, device reactivations, wireless number changes, the addition or purchasing of services including airtime, enrollments or content, and wireless number porting for wireless devices 14 that have previously been activated or provisioned.

In one or more embodiments, the wireless carrier network 16 is connected to a wireless carrier server 18 that forwards the activation message to the subscriber provisioning system 22, either directly or through a destination server 20 connected to the subscriber provisioning system 22, to initiate service activation and provisioning of the wireless device 14.

Figure 2:
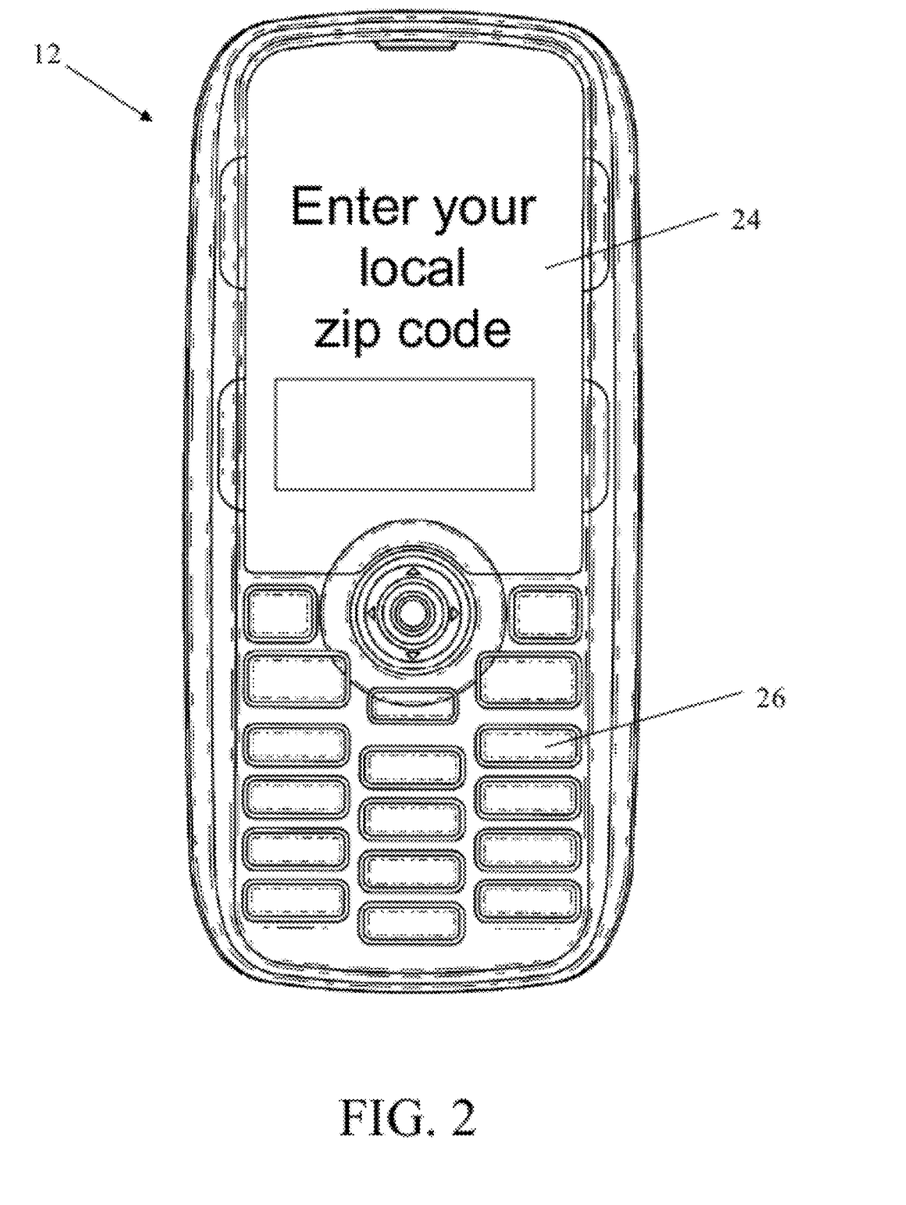
FIG. 2 illustrates an exemplary wireless device display for activating wireless device services in accordance with one or more embodiments of the present disclosure.

In one or more embodiments, the wireless device 14 may include a user interface screen displaying a message that prompts a user to take certain actions to be used for the activation of services. Referring now to FIG. 2, an exemplary display for a wireless device 14 when initiating wireless device activation is illustrated in accordance with one or more embodiments. The wireless device 14 includes a display 24 and an input device 26. In some embodiments, the display 24 of the wireless device 14 may be a touch screen that can be used both for display and the input of data. According to one or more embodiments, the display 24 may display a prompt for a user to enter an activation code, such as, for example but without limitation, a local zip code, a telephone number, or a personal identification number (PIN), into the wireless device 14.

Figure 3:
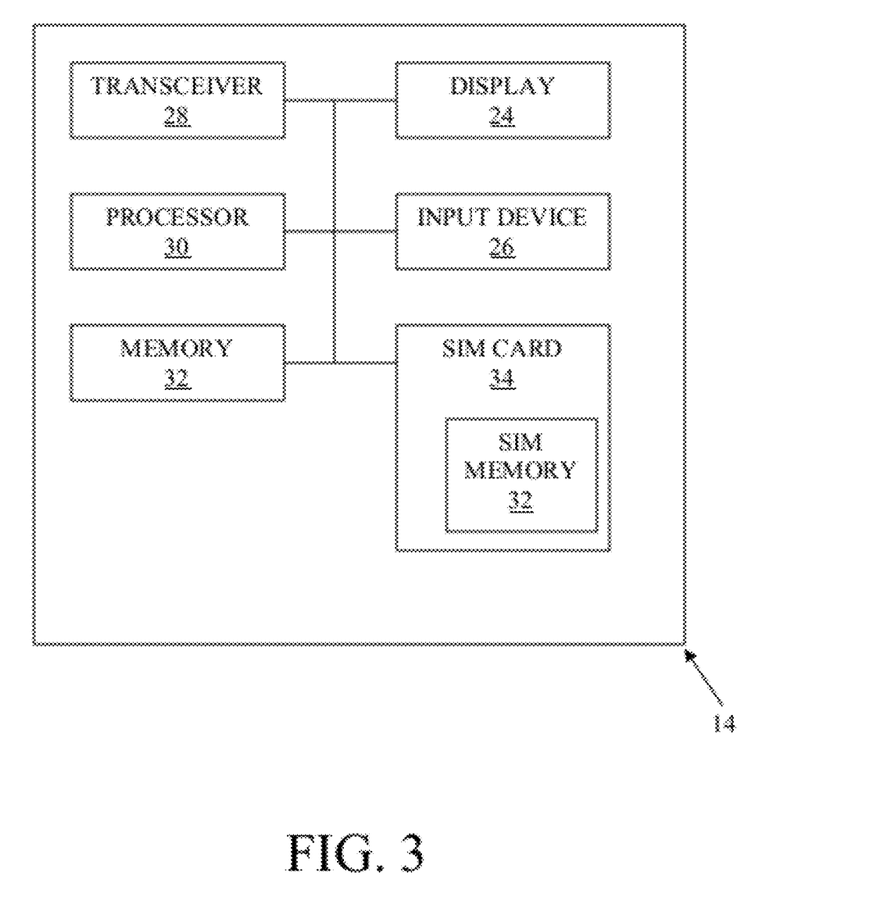
FIG. 3 is a schematic block diagram of a wireless device in accordance with one or more embodiments of the present disclosure.

FIG. 3 is a schematic block diagram of a wireless device 14 in accordance with one or more embodiments of the present disclosure. The wireless device 14 may include a display 24, an input device 26, a transceiver 28, a processor 30, a memory 32 and a SIM card 34. The display 24 may be used to display a prompt the user 12 to enter an activation code used for activating services on the wireless device 14. The user 12 may use the input device 26 to input the activation code(s). The activation code(s) may be a short alphanumerical code independent of the wireless device 14. The memory 32 may be used to store device related information including at least a device serial number, for example, an International Mobile Equipment Identity (IMEI), an Electronic Serial Number (ESN) or Mobile Equipment Identifier (MEID). The SIM card 34 may include a SIM card memory 36 for storing at least a SIM card serial number, for example, an Integrated Circuit Card ID (ICCID).

The processor 30 may be coupled to the input device 26, the SIM card 34 and the memory 32, and configured to collect the activation code and automatically retrieve the SIM card serial number and the device serial number, and generate an activation message that includes at least the activation code, the SIM card serial number and the device serial number. In one embodiment, the activation message is a request for the provisioning or activation of services originating from the wireless device 14, otherwise referred to herein as a Mobile Originating Provisioning Request (MOPR) message. In some embodiments, the activation message may be encrypted to ensure messages are secure, intact and not corrupted. The activation message may then be transmitted to a remote site via an antenna 38 coupled to transceiver 28. The transceiver 28 may be configured to transmit the activation message over a provisioning channel available to inactive wireless devices for requesting activation of services on the wireless device. The provisioning channel may, for example, be a Unstructured Supplementary Service Data (USSD) channel, a Short Message Service (SMS) messaging channel or a Wireless Application Protocol (WAP) messaging channel.

In one or more embodiments in which a USSD channel is made available for an inactive wireless device 14 to utilize, the wireless device 14 initially requests a USSD session in which a real time connection session is established between the wireless device 14 and a remote device over the USSD provisioning channel 15. USSD is a session oriented service that allows the real time exchange of information during a communication session, as opposed to other types of messaging data channels that require the storage and forwarding of messages. During the USSD real time connection session, the activation message is transmitted from the wireless device 14 to the remote component with which it has established a USSD connection session. A typical USSD message starts with a "*" followed by digits which indicate an action to be performed or are parameters, with each group of numbers is separated by a *, and the message is terminated with a "#." Thus, by way of example without limitation, the activation message may appears as follows over the USSD connection "*[service provider forwarding code]*[activation code]*[SIM card serial number]*[device serial number]#."

In one or more embodiments directed to the specific application of prepaid wireless communications, subscriptions can be formulated and the parameters loaded onto the SIM card 34. In one embodiment, the system/service provider activates subscriptions by loading the subscription's parameters on the SIM card 34 that is to be used for the particular wireless device 14. This allocation may occur before the user 12 actually enables the subscription and activates the subscription on the device 14.

According to one or more embodiments, the SIM card memory 36 may store a software application for initiating activation of services on the wireless device 14. The SIM card memory 36 can be implemented in an external or internal machine-readable medium, which may be any mechanism that provides (i.e. stores and/or transmits) information in a form readable by the processor 38. For example, the machine-readable medium may be a read only memory (ROM), a random access memory (RAM), a cache, a hard disk drive, a portable storage media, an optical storage media, a flash memory device or any other memory device capable of storing information. The SIM card memory may be used to store, arrange and retrieve data. The SIM card memory 36 may provide instructions, which when read by processor 30, cause the processor 30 to perform operations for initiating activation of services on the wireless device 14.

In one or more embodiments, the software application may automatically be initiated upon the detection of the powering on of the wireless device 14 for "out of the box" activation services, wherein the software application may include an initial wireless device boot up sequence that prompts the user to enter an activation code, such as a short alphanumeric code, to commence activation after the wireless device 14 has been powered up. In a preferred embodiment, the activation code can be a 5 digit zip code but may also include other required data inputs to initiate the proper MOPR and complete the user's provisioning request. The user input may be used to determine which particular services and subscriptions are to be provisioned. For example, the user input may be used to determine which rate center a wireless phone number is requested from the carrier in order to initiate provisioning. The software application may provide instructions to the processor 30 to collect the activation code entered by the user 12 along with the wireless device serial number (ESN, IMEI or MEID) and the SIM card serial number (ICCID). The software application may also provide instructions to the processor 30 to generate an activation message, such as a MOPR message, with the collected data and transmit it to the applicable wireless carrier network 16 via a designated provisioning channel 15 that is able to be accessed by inactive wireless devices 14.

In one embodiment, the software application may provide instructions to the processor 30 to generate a message to be displayed on the display 24 in the event that the MOPR is not completed or acknowledged within a predetermined period of time. The message may instruct the user 12 to contact user support in order to activate the wireless device 14. Otherwise provisioning and activation messages may be displayed on the display 24.

Figure 4:
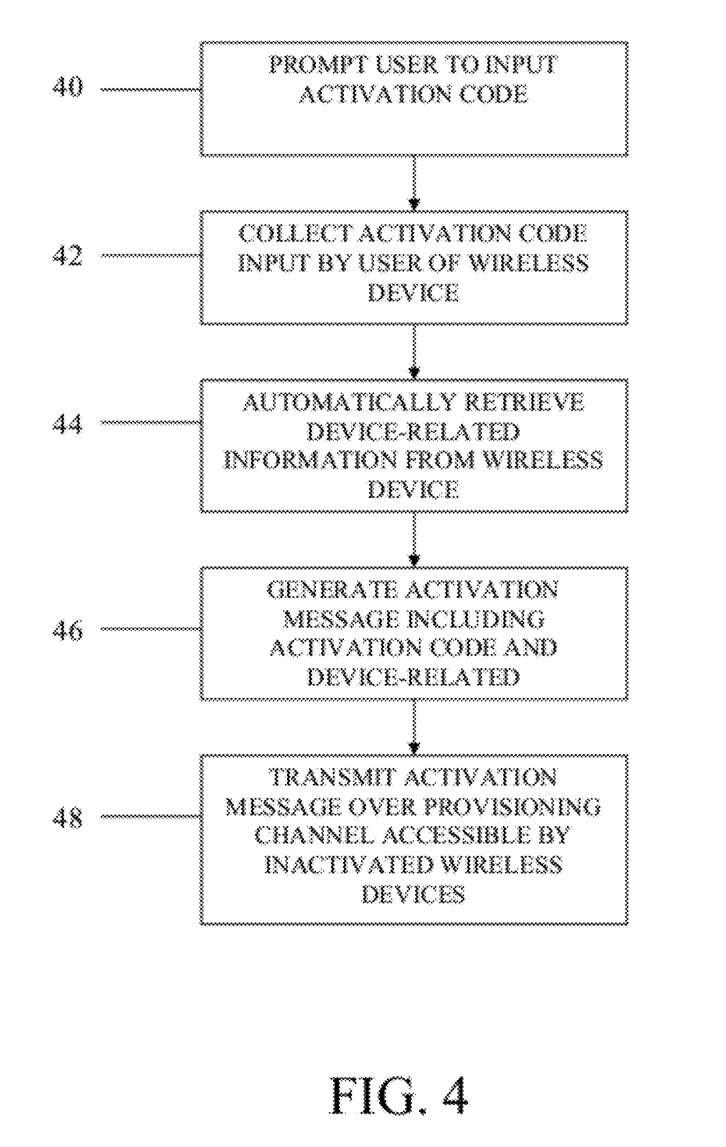
FIG. 4 is an operation flow diagram illustrating a method of generating an activation message on a wireless device in accordance with one or more embodiments of the present disclosure.

FIG. 4 is an operation flow diagram illustrating a method of operation for the wireless device 14 in generating the activation message in accordance with one or more embodiments of the present disclosure. Upon the detection that activation services are being requested for the wireless device 14 (e.g., upon initial powering up of the wireless device 14 or upon a user-initiated request), the wireless device 14 prompts a user to input an activation code in operation 40. The wireless device 14 collects the activation code input by the user 12 of the wireless device 14 to be used for activating services on the wireless device 14 in operation 42. In one embodiment, the wireless device 14 prompts the user 12 on display 24 to input the code using the input device 26. The processor 30 may then execution instructions of the software program so as to automatically retrieve device-related information from the memory 32 of the wireless device 14 in operation 44, wherein such device-related information includes a serial number for the wireless device 14. A serial number for the SIM card 34 is also automatically retrieved from the SIM card memory 36 in operation 44. The wireless device 14 then generates an activation message including the input activation code and the retrieved device-related information in operation 46. The transceiver 28 of the wireless device 14 may then transmit the activation message over the provisioning channel 15 accessible by inactive wireless devices for delivery to a remote site to be used for the activation of services on the wireless device 14 in operation 48. In one or more embodiments, such as when establishing a USSD connection, the wireless device 14 may establish an activation session over the provisioning channel 15 to transmit the activation message.

In one or more embodiments, the wireless carrier network 16 has available a provisioning channel 15, such as USSD, SMS or WAP messaging channels, to support the transmission and delivery of the MOPR from inactive wireless device 14. This provisioning channel 14 is different from the normal communications channel over which the wireless device will conduct normal communications over the wireless carrier network 16 once activated and/or provisioned. This provisioning channel 14 is also different from the conventional website-based, IVR telephone-based or customer service representative channels used in previously known activation methods. The provisioning channel 15 may be available to inactive/unactivated wireless devices 14 having the special-purpose SIM card software application that instructs the wireless device 14 to activate itself over the provisioning channel 15.

Other types of system hardware and software than that described here could also be used, depending on the capacity of the wireless carrier network 16 to accommodate multiple requests for service activation. For example, the wireless carrier server 18 may be part of a server farm or server network, which is a logical group of one or more servers. As another example, there could be multiple servers 18 that may be associated or connected with each other, or multiple servers could operate independently, but with shared data. In a further embodiment and as is typical in large-scale systems, application software could be implemented in components, with different components running on different server computers, on the same server, or some combination. One skilled in the art will recognize that although referred to in the singular, a processor or server may actually consist of a plurality of computing devices that operate together to provide data in response to requests from other computing devices. Thus, as used herein the term processor or server more accurately refer to a computing device or set of computing devices that work together to respond to specific requests.

Figure 5:
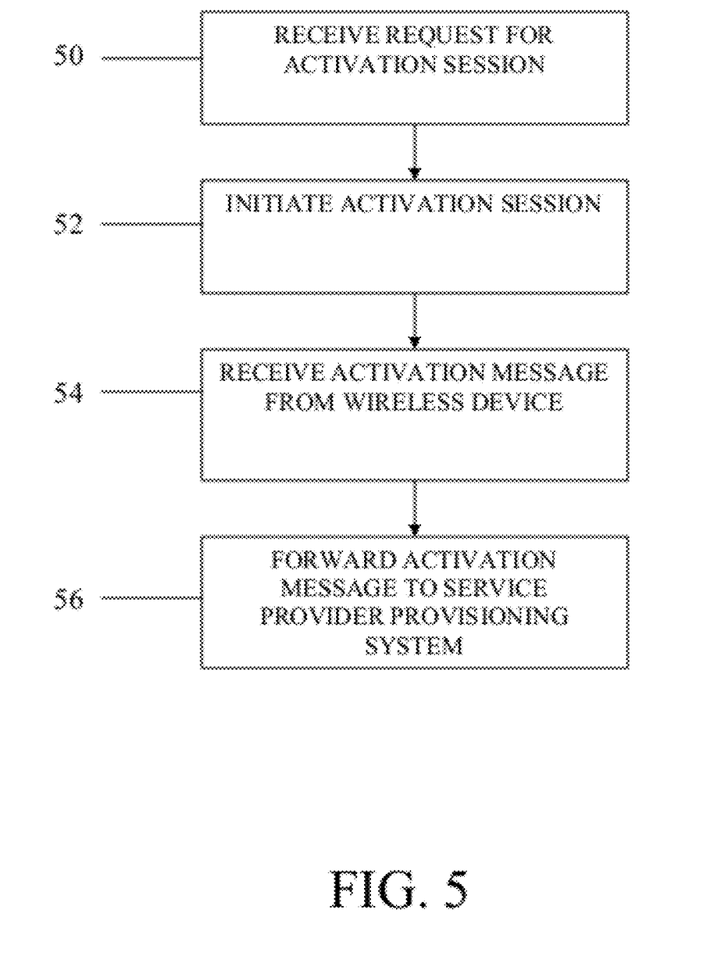
FIG. 5 is an operation flow diagram illustrating a method of forwarding an activation message over a wireless carrier network in accordance with one or more embodiments of the present disclosure.

FIG. 5 is an operation flow diagram illustrating a method of forwarding an activation message over a wireless carrier network 16 in accordance with one or more embodiments of the present disclosure. In one or more embodiments, the wireless carrier network 16 receives a request over the provisioning channel 15 to initiate an activation session (e.g., a USSD connection session) in operation 50. The wireless carrier network 16 then established an activation session with the wireless device 14 in operation 52. The wireless carrier network 16 then receives the activation message transmitted from the wireless device 14 over the provisioning channel 15 accessible to inactive wireless devices in operation 54. In some embodiments, such as those embodiments in which an activation session is not required, the wireless carrier network 16 will not perform the operations associated with establishing an activation session and will simply receive the activation message transmitted from the wireless device 14. Once the activation message is received, the wireless carrier network 16 then forward the activation message to the subscriber provisioning system 22 operated by a service provider in operation 56 for the activation of services.

Figure 6:
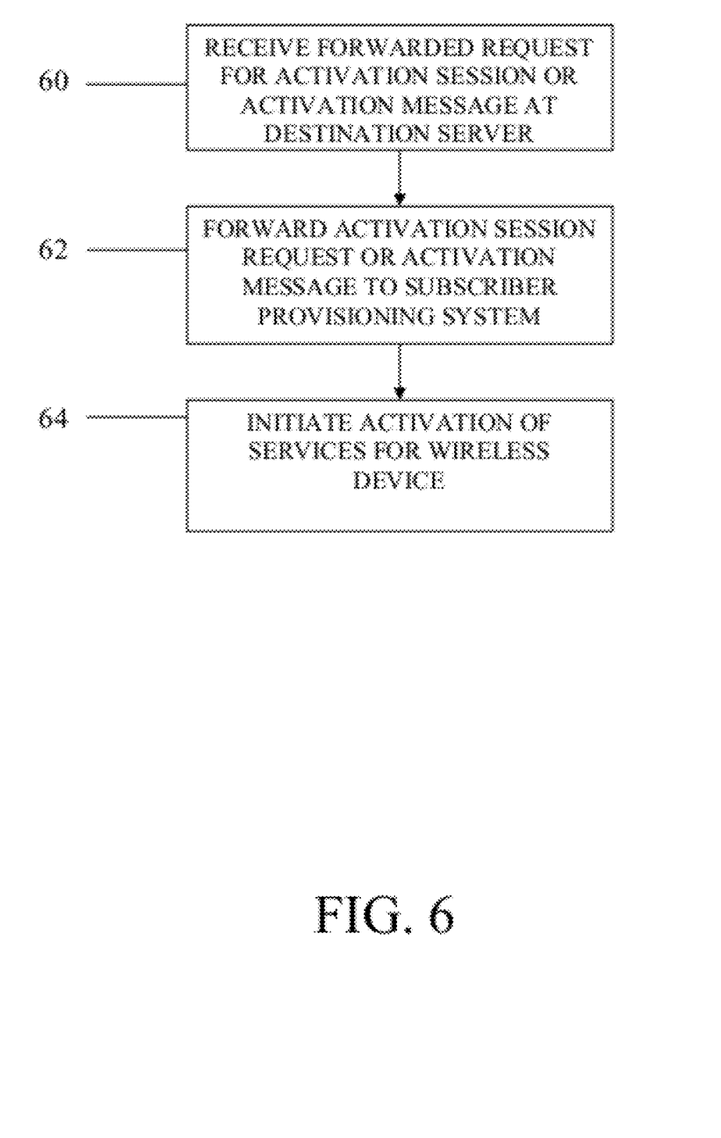
FIG. 6 is an operation flow diagram illustrating a method of operating a subscriber provisioning system to activate services on a wireless device in accordance with one or more embodiments of the present disclosure.

Referring now to FIG. 6, an operation flow diagram is provided illustrating a method of operating a subscriber provisioning system 22 to activate services on the wireless device 14 in accordance with one or more embodiments of the present disclosure. The subscriber provisioning system 22 may have a server or a plurality of servers that operate independently or together in response to one or more request for service activation on wireless devices 14. At the service provider site, a destination server 20 may also be connected to the subscriber provisioning system 22 for receiving incoming activation messages and forwarding them to the subscriber provisioning system 22 for service activation and provisioning of the wireless device 14. The destination server receives an activation message or a request to establish an activation session from the wireless carrier network 16 in operation 60. The destination server 20 forwards the request or activation message to the subscriber provisioning system 22 in operation 62. The request or activation message is then processed in operation 64 to initiate the activation of services on the wireless device 14.

The subscriber provisioning system 22 may be configured to receive the activation message from the wireless carrier network 16 and may further include a network interface module (not shown) for maintaining connectivity with the wireless carrier network 16 in order to receive activation messages therefrom. In one embodiment, the subscriber provisioning system 22 may receive the activation message via USSD, a Short Message Service (SMS), a Virtual Private Network (VPN), a Digital Signal 3 (DS3), Signaling System #7 (SS7), or other suitable connectivity. In one embodiment, once the subscriber provisioning system 22 receives the activation message, the provisioning channel for that subscription can remain active or be deactivated. In one or more embodiments, the activation message may then be processed by existing back office processes. Error handling and messaging may be used to identify, record and respond to erroneous or missing data from the activation message.

In one or more embodiments, the activation messaging may be used to provide additional subscriber services and additional features for the SIM software application to support the additional services. In some embodiments, this may enhance the use of the MOPR activation message for subscriber self-services by utilizing existing network and infrastructure for subscriber provisioning systems 22 and wireless carrier networks 16. In one embodiment, the activation messaging of the present disclosure may enable a user to initiate service requests directly from the wireless device 14 to perform a number of possible subscriber self services, such as but not limited to activation, upgrade, reactivation, perform a wireless number change, and/or request a wireless number port provisioning request, allowing such service requests through their handset without requiring access to an agent, website or another telephone.

The following examples provided below demonstrate without limitation exemplary functionality using activation messaging on various provisioning channels.

EXAMPLE 1

USSD MOPR and Messaging Solution

According to one or more embodiment, the SIM software application may be programmed for use on a SIM profile to prompt a user 12 of the wireless device 14 with one or more of the following options at boot up based upon an available device or SIM variable that will indicate that the handset has not been provisioned (or otherwise prompt a user 12 at other times based on a selectable menu):

Option 1: Activation. If option 1 is selected for activation of the wireless device 14, the SIM software application may prompt the user to enter the activation code (e.g., five digit zip code) to be included in the activation message. Optionally, the user may further be prompted to provide a 10 digit user contact number in case the user needs to be reached if there are any problems activating the wireless device. In one or more embodiments, the activation message may include one or more pieces of the following information used for activation purposes: Short Code (from SIM software application), a Reseller ID (from SIM software application), Transaction ID "1" (from SIM software application), IMEI (from handset), ICCID (from SIM software application), activation code (e.g., zip code) from user input, and a 10 digit optional user contact number (user input value).

Option 2: Upgrade. If option 2 is selected for upgrading the wireless device 14, the SIM software application may prompt the user 12 to enter information related to the wireless device 14 to be used in upgrading the device 14. For example, the user can be prompted to enter the 10 digit wireless number associated with the wireless device 14, the old IMEI or a portion of the the old IMEI (e.g., the last 5 digits of old IMEI), and at least a portion of the old ICCID (e.g., the first 7 digits of the old ICCID) to be included in the activation message. In some embodiments, some of this information may be automatically retrieved from the wireless device 14 by the SIM software application. In one or more embodiments, the activation message may include one or more pieces of the following information used for upgrade purposes: Short Code (from SIM software application), Reseller ID (from SIM software application), Transaction ID "2" (from SIM software application), IMEI (from handset), ICCID (from SIM software application), Mobile Number (user input value), OLD IMEI or portion of OLD IMEI (user input value), and a portion of OLD ICCID (user input value).

Option 3: Reactivation. If option 3 is selected for reactivation, the SIM software application may prompt the user 12 to enter information, such as an airtime pin number and/or a alphanumeric promo code, to be included in the activation message and used for reactivation purposes by the subscriber provisioning system 22. In one or more embodiments, the activation message may include one or more pieces of the following information used for upgrade purposes: Short Code (from SIM software application), Reseller ID (from SIM software application), Transaction ID "3" (from SIM software application), IMEI (from handset), ICCID (from SIM software application), Airtime Pin (user input value), and an optional Promo Code (user input value).

Option 4: Number Change. If option 4 is selected for a number change, the SIM software application may prompt the user 12 to enter an activation code (e.g., a five digit zip code) to be included in the activation message. The SIM software application may further prompt a message to the user 12 advising that they will lose their existing wireless number and that a new number will be assigned. In one or more embodiments, the activation message may include one or more pieces of the following information used for upgrade purposes: Short Code (from SIM software application), Reseller ID (from SIM software application), Transaction ID "4" (from SIM software application), IMEI (from handset), ICCID (from SIM software application), and activation code (user input value).

Menu Option 5: Port. If option 5 is selected for porting, the SIM software application may display, "Call Customer Service to submit your port request" on the handset display 24.

Menu Option 6: Add Services If option 6 is selected for Purchasing, Adding Airtime Service or Enrollments, the SIM software application may prompt the user 12 to enter information, such as an airtime pin number and/or a alphanumeric promo code credit card number or account information, to be included in the activation message and used for the purposes of the subscriber provisioning system 22. In one or more embodiments, the activation message may include one or more pieces of the following information: Short Code (from SIM software application), Reseller ID (from SIM software application), Transaction ID "3" (from SIM software application), IMEI (from handset), ICCID (from SIM software application), Airtime Pin (user input value), and an optional Promo Code (user input value) or any other required information.

In one or more embodiments, the SIM software application may validate field length on all user input values to ensure the correct or a sufficient number of characters are entered by the user 12. For example, the character length validation per input value may be as follows: zip code=5 digit validation, user contact number=null or 10 digit validation, mobile number=10 digit validation, old IMEI or last 5 digits of old IMEI=greater than 5 digit validation, airtime pin=greater than 14 digit validation, promo code=null or 5 digit validation, and old ICCID=7 digits. If the required length of characters is not entered by the user 12, the wireless device 14 may display the following message: "Invalid entry. Please try again". In one embodiment, after 3 attempts by the user 12 to enter the correct number of characters on any application option, the wireless device 14 may display "Call Customer Service" on the handset display.

Once user 12 completes the required input based upon the selected menu option, the SIM software application may establish a USSD connection via a provisioned USSD short activation code. Once the USSD connection is established, the SIM software application may generate the MOPR and deliver the message via the wireless device 14 to the destination server 20 based upon the selected menu option.

In one embodiment, the SIM software application may perform error handling and message acknowledgement. For example, for Off Network Validation, after three (3) unsuccessful attempts by a user through any application option, the SIM software application may present "Call Customer Service on the handset display. For Network Down Validation, if the wireless carrier network 16 is unable to connect with or deliver the MOPR to the destination server 20, the wireless carrier network 16 may return an acknowledgment to the wireless device 14 as a text string "Call Customer Service" which will show on the handset display 24. For Device Support Validation, the SIM software application may be configured to work on certain handset models. If a non-supported model is used, the SIM may not display the SIM software application boot up option or the menu options. For Back Office Error Notification, any USSD acknowledgement message returned by the destination server 20 may include back office error messages or instructions for the user to display as a text string on the handset display 24. For *Upgrade Support Validation*, when selecting the upgrade option at boot up or in the menu option, compare the first 7 digits of the OLD ICCID and the first 7 digits of the Current SIM. If different, display "Call Customer Service" on the handset display 24. If the same, allow the MOPR to proceed. Additionally, for *SIM Application Priority*, the SIM software application may take presentation priority over the handset main screen or wake up graphic upon handset power cycle.

While various embodiments described herein have described the provisioning channel 15 as being a USSD channel available for use by inactive wireless devices 14, it is further understood that other types of messaging channels available for use by inactive wireless devices 14 can be utilized. By way of example but without limitation, such other types of messaging channels may include SMS and WAP.

One skilled in the art would appreciate that the examples described above, are merely illustrative of exemplary software application functionality using activation messaging on different provisioning channels. It is understood by a person skilled in the art, the additional functionalities may be implemented with the SIM software application. For example, the software application may be able to be flexed (enabled) "on" or "off" at the point of manufacturing. Further, the user entry or input fields may be table driven to support additional entries as required by changing needs in the future and may be able to be added or modified via administrative over-the-air (OTA) messaging, and the available menu options for the activation of services can be flexed (enabled) "on" or "off" and updated via administrative over-the-air (OTA) messaging (e.g., USSD or SMS). In some embodiments, a user 12 may not be charged service charges for the USSD, SMS or WAP activation and browsing messages. In some embodiments, the particular wireless carrier network 16 and type of provisioning channel can vary and be changed or modified. In one embodiment, the SIM software application may support Re-Boot and Rescan radio functionality on the wireless device 14. The SIM software application may also delete the LOCI file upon generating and sending the MOPR generated through certain actions (e.g., menu options 1 or 2 described above). These features may be customizable at the point of manufacturing by the carrier as the requirements may vary based upon HLR configuration or the provisioning channel selected for the activation message. Finally, additional Subscriber Services Menus may be added to support any service requests that would be required in the future.

As can be envisioned by a person skilled in the art, the systems and methods described may be used to activate various services on a wireless device 14 through use of a provisioning channel 15 accessible by inactive or unprovisioned wireless devices 14. In one or more embodiments, the simplified activation system and method described in various embodiments herein improve the user experience by providing a new messaging channel for services activations and limiting a user's need to use the Internet or telephone for access to the service provider's back office system for the purpose of wireless service activations. It further reduces the chance for user input errors and simplifies the activation process by reducing the number of alphanumeric characters that need to be entered by the user from a typical forty or more (when activating via the Internet or telephone and forced to enter all of the device and SIM card serial numbers) to a much shorter code, such as, for example but without limitation, a five digit zip code. This reduction of required user input improves wireless service activation success rates of initial activations and expands the accessibility of wireless service to users that do not have access to traditional wired communication services or access to another telephone for activation. The present invention also leverages existing service provider's back office systems and the wireless carrier's current network and infrastructure.

While the apparatus and method have been described in terms of what are presently considered to be the most practical and preferred embodiments, it is to be understood that the disclosure need not be limited to the disclosed embodiments. It is intended to cover various modifications and similar arrangements included within the spirit and scope of the claims, the scope of which may be accorded the broadest interpretation so as to encompass all such modifications and similar structures. The present disclosure includes any and all embodiments of the following claims.

The invention claimed is:

1. A method for activating services on a wireless device, the method comprising:
 receiving at least one code input into the wireless device to be used for activating services on the wireless device;
 automatically retrieving device-related information from the wireless device;
 generating an activation message within the wireless device including the input code and the device-related information; and
 transmitting the activation message directly from the wireless device over a provisioning channel accessible by inactive wireless devices for delivery to a remote site for use in activating services on the wireless device.

2. The method of claim 1, wherein the wireless device is initially inactive, wherein the method further comprises generating and transmitting the activation message prior to the initial activation of the wireless device.

3. The method of claim 2, wherein the services to be activated include initial activation of the wireless device for the intended use of the wireless device.

4. The method of claim 1, wherein the at least one input code comprises a short alphanumerical code independent of the wireless device.

5. The method of claim 1, wherein the automatically retrieved device-related information includes a serial number for the wireless device and a serial number for a subscriber identity module (SIM) card installed in the wireless device that is automatically retrieved from a SIM card memory.

6. The method of claim 1, wherein services requested to be activated include at least one of device upgrades, device reactivations, wireless number changes, wireless number porting, and the addition or purchasing of services including airtime, enrollments or content.

7. The method of claim 1, wherein the activation message comprises a request for the provisioning of services for the wireless device.

8. The method of claim 1, wherein the activation message is encrypted.

9. The method of claim 1, wherein the activation message is encrypted.

10. The method of claim 1, wherein the generated and transmitted activation message does not include phone number associated with the wireless device, wherein the services to be activated by the remote site are further not related to a phone number associated with the wireless device.

11. A computer program product comprising a non-transitory computer-readable medium having instructions, the instructions being operable to enable a wireless device, when executed by a processor, to perform a method for activating services on the wireless device, the method comprising:
 upon activation of the computer program product, automatically retrieving device-related information from the wireless device;
 generating an activation message within the wireless device that includes the retrieved device-related information; and
 causing the wireless device to transmit the activation message directly from the wireless device over a provisioning channel accessible by inactive wireless devices for delivery to a remote site for use in activating services on the wireless device.

12. The computer program product of claim 11, wherein the instructions for generating an activation message further comprising instructions for:
 causing a prompt to be displayed on a display of the wireless device for at least one code to be input into the wireless device to be used for activating services on the wireless device;
 collecting the at least one code input into the wireless device in response to the prompt; and
 generating the activation message to include the retrieved device-related information and the collected at least one input code.

13. The computer program product of claim 11, wherein the wireless device is initially inactive, wherein the method further comprises generating and transmitting the activation message prior to the initial activation of the wireless device.

14. The computer program product of claim 13, wherein the services to be activated include initial activation of the wireless device for the intended use of the wireless device.

15. The computer program product of claim 12, wherein the at least one input code comprises a short alphanumerical code independent of the wireless device.

16. The computer program product of claim 11, wherein the automatically retrieved device-related information includes a serial number for the wireless device and a serial number for a subscriber identity module (SIM) card installed in the wireless device that is automatically retrieved from a SIM card memory.

17. The computer program product of claim 11, wherein services requested to be activated include at least one of device upgrades, device reactivations, wireless number changes, wireless number porting, and the addition or purchasing of services including airtime, enrollments or content.

18. The computer program product of claim 11, wherein the activation message comprises a request for the provisioning of services for the wireless device.

19. The computer program product of claim 11, wherein the activation message is encrypted.

20. The computer program product of claim 11, wherein the generated and transmitted activation message does not include phone number associated with the wireless device, wherein the services to be activated by the remote site are further not related to a phone number associated with the wireless device.

21. A method for activating services on a wireless device, the method comprising:
 loading subscription parameters for the services to be activated in a memory for the wireless device; and
 automatically retrieving device-related information from the wireless device;
 generating an activation message within the wireless device that includes the retrieved device-related information;
 causing the wireless device to transmit the activation message directly from the wireless device for delivery to a remote site for use in activating services on the wireless device; and
 receiving an activation response from the remove site for activating services on the wireless device at least partially based on the subscription parameters loaded in the memory of the wireless device.

22. The method of claim 21, further comprising:
 causing a prompt to be displayed on a display of the wireless device for at least one code to be input into the wireless device to be used for activating services on the wireless device;
 collecting the at least one code input into the wireless device in response to the prompt; and
 generating the activation message to include the retrieved device-related information and the collected at least one input code.

23. The method of claim 21, wherein the wireless device is initially inactive, wherein the method further comprises generating and transmitting the activation message prior to the initial activation of the wireless device.

24. The method of claim 23, wherein the services to be activated include initial activation of the wireless device for the intended use of the wireless device.

25. The method of claim 21, wherein the at least one input code comprises a short alphanumerical code independent of the wireless device.

26. The method of claim 21, wherein the wireless device includes a subscriber identity module (SIM) card installed in the wireless device, wherein the subscription parameters for the services to be activated are loaded into a memory of the SIM card.

27. The method of claim 26, wherein the automatically retrieved device-related information includes a serial number for the wireless device that is automatically retrieved from a memory of the wireless device and a serial number for the SIM card that is automatically retrieved from the memory of the SIM card.

28. The method of claim 21, wherein services requested to be activated include at least one of device upgrades, device reactivations, wireless number changes, wireless number porting, and the addition or purchasing of services including airtime, enrollments or content.

29. The method of claim 21, wherein the generated and transmitted activation message does not include a phone number associated with the wireless device, wherein the services to be activated by the remote site are further not related to a phone number associated with the wireless device.

30. A computer program product comprising a non-transitory computer-readable medium having instructions, the instructions being operable to enable a wireless device, when executed by a processor, to perform a method for activating services on the wireless device, the method comprising:
 loading subscription parameters for the services to be activated in a memory for the wireless device; and
 automatically retrieving device-related information from the wireless device;
 generating an activation message within the wireless device that includes the retrieved device-related information;
 causing the wireless device to transmit the activation message directly from the wireless device for delivery to a remote site for use in activating services on the wireless device; and
 receiving an activation response from the remove site for activating services on the wireless device at least partially based on the subscription parameters loaded in the memory of the wireless device.

31. The computer program product of claim 30, wherein the method further comprises:
 causing a prompt to be displayed on a display of the wireless device for at least one code to be input into the wireless device to be used for activating services on the wireless device;
 collecting the at least one code input into the wireless device in response to the prompt; and
 generating the activation message to include the retrieved device-related information and the collected at least one input code.

32. The computer program product of claim 30, wherein the wireless device is initially inactive, wherein the method further comprises generating and transmitting the activation message prior to the initial activation of the wireless device.

33. The computer program product of claim 32, wherein the services to be activated include initial activation of the wireless device for the intended use of the wireless device.

34. The computer program product of claim 30, wherein the at least one input code comprises a short alphanumerical code independent of the wireless device.

35. The computer program product of claim 30, wherein the wireless device includes a subscriber identity module (SIM) card installed in the wireless device, wherein the subscription parameters for the services to be activated are loaded into a memory of the SIM card.

36. The computer program product of claim 35, wherein the automatically retrieved device-related information includes a serial number for the wireless device that is automatically retrieved from a memory of the wireless device and a serial number for the SIM card that is automatically retrieved from the memory of the SIM card.

37. The computer program product of claim 30, wherein services requested to be activated include at least one of device upgrades, device reactivations, wireless number changes, wireless number porting, and the addition or purchasing of services including airtime, enrollments or content.

38. The computer program product of claim 30, wherein the generated and transmitted activation message does not include a phone number associated with the wireless device, wherein the services to be activated by the remote site are further not related to a phone number associated with the wireless device.

* * * * *

UNITED STATES PATENT AND TRADEMARK OFFICE
CERTIFICATE OF CORRECTION

| | | |
|---|---|---|
| PATENT NO. | : 8,538,394 B2 | Page 1 of 1 |
| APPLICATION NO. | : 13/355509 | |
| DATED | : September 17, 2013 | |
| INVENTOR(S) | : James P. Zimmerman et al. | |

It is certified that error appears in the above-identified patent and that said Letters Patent is hereby corrected as shown below:

On the title page item (73) Assignee:

Please replace "Tracfone" with --TracFone--.

Signed and Sealed this
Seventeenth Day of December, 2013

Margaret A. Focarino
*Commissioner for Patents of the United States Patent and Trademark Office*